United States Patent [19]

Hitomi

[11] Patent Number: 4,747,559
[45] Date of Patent: May 31, 1988

[54] BAIL ARM TURNING-OVER DEVICE FOR A FISHING REEL

[75] Inventor: Yasuhiro Hitomi, Sakai, Japan

[73] Assignee: Shimano Industrial Company Limited, Osaka, Japan

[21] Appl. No.: 855,700

[22] Filed: Apr. 25, 1986

[30] Foreign Application Priority Data

May 9, 1985 [JP] Japan .................. 60-68487[U]

[51] Int. Cl.$^4$ .............................................. A01K 89/00
[52] U.S. Cl. .......................... 242/84.26; 242/84.21 R
[58] Field of Search ................... 242/84.26, 84.21 R

[56] References Cited

U.S. PATENT DOCUMENTS

| | | | |
|---|---|---|---|
| 3,342,442 | 9/1967 | Brantingson | 242/84.2 G |
| 4,350,312 | 9/1982 | Masclet | 242/84.2 G |
| 4,427,161 | 1/1984 | Sakumoto | 242/84.2 G |
| 4,535,952 | 8/1985 | Carlsson | 242/84.2 G |

FOREIGN PATENT DOCUMENTS 59-47471 3/1984 Japan .

*Primary Examiner*—Stuart S. Levy
*Assistant Examiner*—Steven M. Dubois
*Attorney, Agent, or Firm*—Stevens, Davis, Miller & Mosher

[57] ABSTRACT

The device includes a turnover lever mounted on the side surface of a first mounting arm supporting the bail arm. A second shaft extends perpendicularly to a first shaft by which the support for the bail arm is pivoted on the top surface of the first mounting arm. An engaging projection projects from the top surface of the support. The turnover lever is superposed on the top surface of the bail arm support, so that an urging surface is provided at the superposed portion. The urging surface contacts the engaging projection so as to apply a torque to the bail arm support to turn over the bail arm to a fishing line releasing position thereof.

3 Claims, 3 Drawing Sheets

BAIL ARM TURNING-OVER DEVICE FOR A FISHING REEL

FIELD OF THE INVENTION

The present invention relates to a bail arm turning-over device for a fishing reel, and more particularly, to a bail arm turning-over device which turns over the bail arm from the fishing line winding position to the line releasing position by operating a turn-over lever, wherein the bail arm is supported across first and second mounting arms of the fishing reel.

BACKGROUND OF THE INVENTION

Generally, fishing reels equipped with a bail arm have hitherto been called spinning reels and are well-known. In this type of reel, a rotary frame is supported rotatably at the front of a reel body so that the rotary frame is rotatably driven by a handle supported to the reel body. The reel is provided at circumferentially symmetrical positions with first and second mounting arms projecting forwardly of the rotary frame and supporting therebetween the bail arm. The bail arm is put in the line winding position to catch the line and the rotary frame rotates to wind the line onto a spool disposed in front of the rotary arm. The bail arm is turned over or pivoted to the line releasing position so as to free the line to permit casting.

In the spinning reel constructed as described above, in order to turn over the bail arm from the line winding position to the line releasing position, there have been proposed methods in which an angler grips the bail arm directly by his hand to turn it over and he operates the turnover lever by, for example, the forefinger of his hand gripping a fishing rod so as to turn over the bail arm through the turnover lever. Japanese Utility Model Laid-Open Gazette No. Sho 59-47,471 discloses a conventional reel, in which a support for the bail arm is pivoted to the top surface of one mounting arm at the rotary arm through a first shaft such that it can be freely turned over. In this latter reel, a cutout is provided at the circumference of the pivot portion at the support, and the turnover lever is pivoted on the mounting arm and radially outwardly of the rotary frame through a second shaft perpendicular to the first shaft. Also, a projection engageable with the cutout is provided at the lower side of the pivotal portion of the lever, so that the lever is operated to move the support in association therewith, thereby turning over the bail arm.

The turnover lever, which is pivoted to the mounting arm through the second shaft perpendicular to the first shaft, is swingable toward the fishing rod when the fishing reel is mounted thereon, whereby the angler can easily operate the lever by the forefinger of his hand gripping the fishing rod. Also, the turnover lever is operated directly in association with the support through the engagement of the projection with the cutout, thereby yielding a device which is simpler in construction than one using an amplifying mechanism, such as a linkage mechanism or a gear mechanism, in association with the support. However, the support has an insufficient rotary stroke with respect to a turnover angle of the lever because of the lack of an amplifying mechanism. Hence, in order to obtain a sufficient rotary stroke, the pivotal point of the lever and the engaging point of the projection are required to be spaced enough, thereby creating a problem in that the lever must project from the mounting arm largely radially outwardly of the rotary frame.

SUMMARY OF THE INVENTION

An object of the invention is to provide a fishing reel including a bail arm turning-over device which has a simple construction by associating a turnover lever directly with a bail arm support, where the turnover lever is operated at a small turnover angle so as to turn over a bail arm through the support, and a bail arm mounting arm can be made smaller in the sum of the thicknesses of the mounting arm, support and turnover lever in the radial direction of a rotary frame.

The present invention provides a bail arm turning-over device for turning over the bail arm from the fishing line winding position to the fishing line releasing position. The bail arm is supported across first and second mounting arms such that it can be freely turned over. The device includes a bail arm support for supporting the bail arm. The bail arm support is supported rotatably at the top surface of the first mounting arm. The device further includes a first shaft for supporting the bail arm support rotatably to the first mounting arm, a second shaft positioned at the side surface of the first mounting arm and forwardly of the reel beyond the position where the first shaft is disposed, and having its axis perpendicular to that of the first shaft; a turnover lever supported to the first mounting arm through the second shaft and having a pivotal portion, a superposed portion extending therefrom toward the bail arm support and superposed on the top surface of the bail arm support, and an operating portion; and a transmission mechanism for transmitting rotation of the turnover lever to the bail arm support so as to turn over the bail arm. The transmission mechanism is provided at the top surface of the bail arm support and near the center of rotation thereof with an engaging projection and an urging surface at the superposed portion of the turnover lever. The urging surface, when the turnover lever is operated, contacts the engaging projection to thereby apply to the bail arm support a torque for turning over the bail arm toward the fishing line releasing position.

In the above-described construction, when the bail arm is put in the line winding position, the turnover lever is operated to rotate the urging portion in a circular arc around the second shaft, so that the urging portion pushes the engaging projection to rotate the support, thereby turning over the bail arm toward the line releasing position. Also, since the engaging projection is provided at the top surface of the support port and the turnover lever is supported at the side surface of the mounting arm, the urging portion is spaced a large distance from the second shaft, whereby the lever is turned only at a smaller turnover angle so as to ensure the turning-over of the bail arm. Also, the first mounting arm, the support mounted thereon and the turnover lever, can be made smaller in the sum of their thicknesses in the radial direction of the rotary frame.

The above and further objects and novel features of the invention will be more fully apparent from the following detailed description when read in connection with the accompanying drawings.

DETAILED DESCRIPTION OF THE INVENTION

Figure 1:
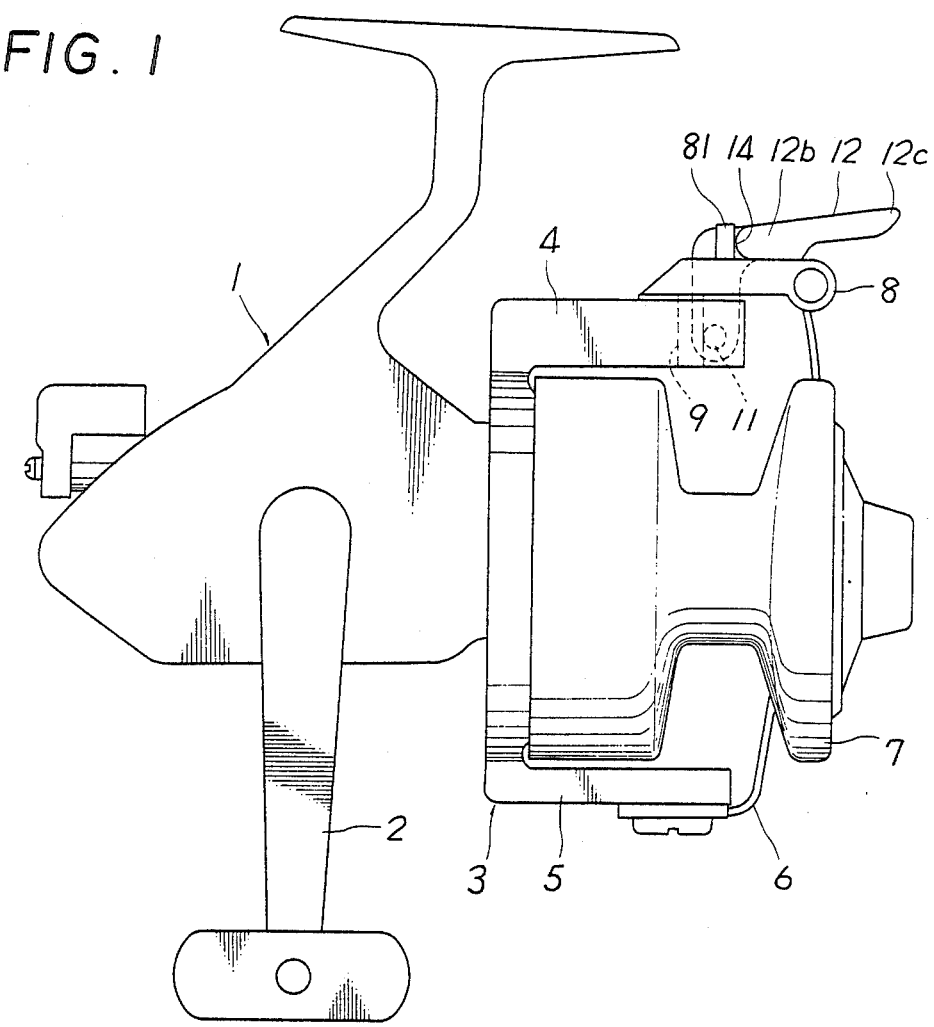
FIG. 1 is a front view of a fishing reel using a bail arm turning-over device of the invention.

Referring to FIG. 1, a fishing reel is shown which is constructed such that a rotary frame 3 driven by a drive mechanism (not shown) including a handle 2 is supported rotatably at the front of a reel body 1, a pair of first and second mounting arms 4 and 5 are provided at the rotary frame 3 phase-shifted at an angle of 180°, a bail arm 6 is supported across the first and second mounting arms 4 and 5 such that bail arm 6 can be freely turned over between the line winding position and the line releasing position, and a spool 7 is held at the front of the rotary frame 3.

On the top surface at the front portion of the first mounting arm 4, a support 8 supporting one end of the bail arm 6 is pivotally supported through a first mounting shaft 9. An engaging projection 81 extending radially outwardly of the rotary frame 3 projects from the top surface of support 8 and near the axis of rotation thereof.

Also, at the first mounting arm 4 is provided a biasing means 20 which, dependent upon whether support 8 is turned toward the fishing line winding position or the line releasing position, changes its biasing direction and biases the support 8 toward one of these positions. A turnover lever 12 is pivoted onto the side surface of the first mounting arm 4 and spaced apart from the pivotal portion of support 8 forwardly of the reel. Turnover lever 12 is provided with a pivotal portion 12a extending along the side surface of the first mounting arm 4, a superposed portion 12b bending from the pivotal portion 12a along the upper surface of the first mounting arm 4 and superposed on the top surface of support 8, and an operating portion 12c extending from the fore end of the superposed portion 12b. At the superposed portion 12b is provided an urging surface 14 which is formed mainly in a circular arc and makes contact with the aforesaid engaging projection 81, so that the turnover lever 12 is operated to apply to the support 8 a torque for turning it over toward the line releasing position.

Figure 4:
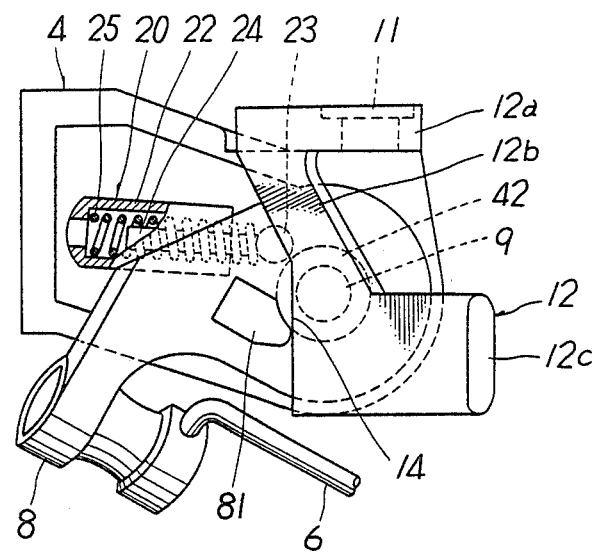
FIG. 4 is a plan view thereof when the bail arm is turned over, corresponding to FIG. 2.
Figure 5:
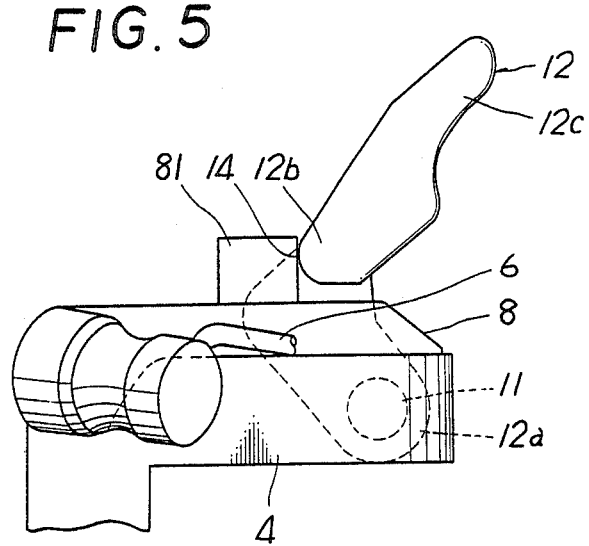
FIG. 5 is a side view of the same.

The engaging projection 81 and urging surface 14 constitute a transmission mechanism for transmitting the rotation of turnover lever 12 to the support 8, thereby turning over the bail arm 6. Now, when it is desired to turn over bail arm 6 from the line winding position in FIG. 1 to the line releasing position in FIG. 4, the angler turns upwardly the control portion 12c at the turnover lever 12 by the forefinger of his hand gripping the fishing rod, whereby the urging surface 14 at the lever 12 pushes the engaging projection 81 so as to swing the support 8 toward the line releasing position shown in FIGS. 4 and 5, thereby turning over the bail arm 6. Since the second shaft 11 is provided on the side surface of the first mounting arm 4 and forwardly of the pivotal portion of the support 8 and the engaging projection 81 is provided on the top surface of the support 8, a distance between the second shaft 11 and the urging surface 14 is made relatively larger without the necessity of increasing the height of engaging projection 81 in the radial direction of the rotary frame 3. Hence, the support 8 is turned at a sufficiently large stroke even with a small turnover angle of the lever 12, thereby always ensuring the turning-over of the bail arm 6.

Furthermore, the support 8 is turned without creating play between the components because the urging surface 14 contacts engaging projection 81 and causes a biasing force therefor.

Also, the bias means 20 comprises a bottomed cylinder 22 having a pivot pin 21, a rod 24 having a pin 23 and inserted into the cylinder 22 movably in reciprocation, and a spring 25 interposed between the bottom of cylinder 22 and the outer surface of pin 23. Pin 21 is fitted into a hole or recess 41 provided at the first mounting arm 4 and pin 23 is fitted into a recess 82 provided at the support 8.

Figure 6:
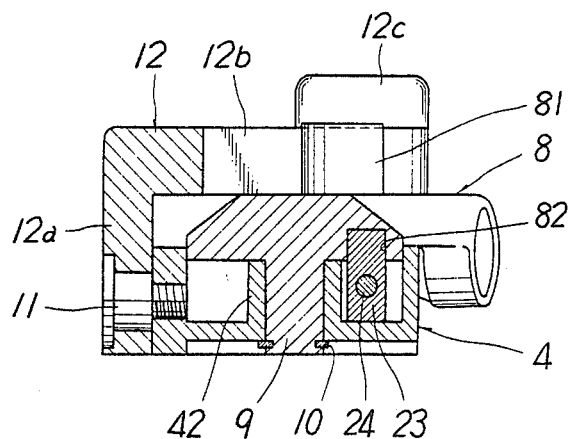
FIG. 6 is a sectional view taken on the line VI—VI in FIG. 2.
Figure 2:
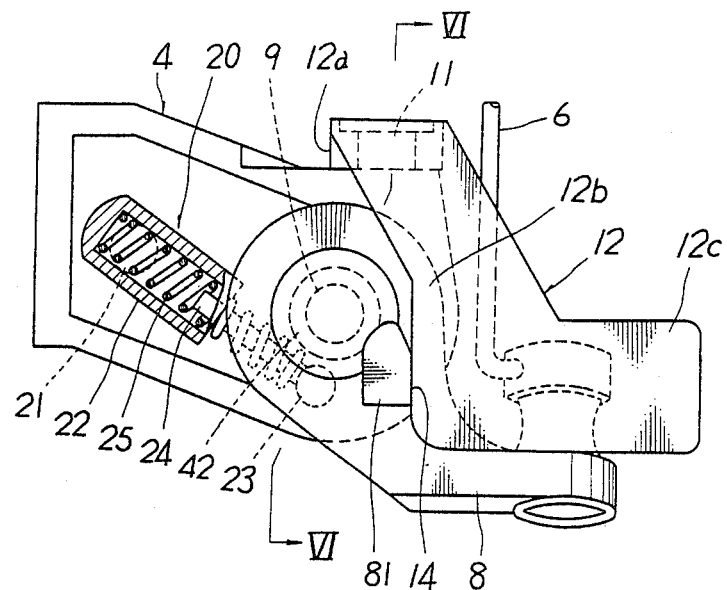
FIG. 2 is a partially cutaway plan view of an embodiment of the bail arm turning-over device of the invention.
Figure 3:
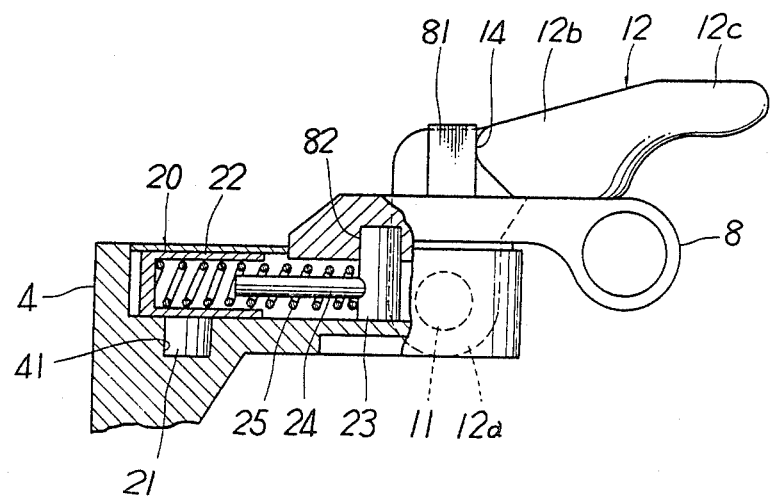
FIG. 3 is a partially cutaway side view of the FIG. 2 embodiment.

In addition, the first shaft 9 may be separate from the support 8, but in this embodiment, is integral with the support 8 and fitted rotatably into a rising boss 42 provided at the first mounting arm 4 and locked thereto by a snap ring 10 as shown in FIG. 6.

As seen from the above, the bail arm turning-over device of the invention, as described above, is provided with the engaging projection 81 at the support 8 and the urging surface 14 at the turnover lever 12, thereby facilitating operation thereof and associating the lever 12 directly with the support 8. Hence, the device is simple in construction, ensures the turnover of bail arm 6, and reduces the sum of the thicknesses of the support 8, lever 12 and first mounting arm 4.

While an embodiment of the invention has been shown and described, the invention is not limited to the specific construction illustrated, which is merely exemplary in the specification rather than defined.

What is claimed is:

1. A bail arm turn over device for turning over a fishing reel bail arm from a line winding position to a line releasing position, said device comprising:

a first and a second mounting arm for supporting said bail arm therebetween;

a bail arm support supported rotatably onto a side surface of said first mounting arm;

a first shaft mounted on said first mounting arm and supporting said bail arm support rotatably relative to said first mounting arm;

a second shaft mounted on another side surface of said first mounting arm and having its axis oriented substantially perpendicularly relative to said first shaft, said second shaft being spaced apart from said first shaft on said first mounting arm and disposed between said first shaft and said bail arm;

a turnover lever supported rotatably to said first mounting arm by said second shaft and having (i) a pivotal portion, (ii) a superposed portion extending from said pivotal portion toward said bail arm support and superposed on a surface of said bail arm support, and (iii) an operating portion;

a transmission mechanism for transmitting a rotational operation of said turnover lever to turn over said bail arm, said transmission mechanism comprising an engaging projection (i) projecting from a side surface of said bail arm support, (ii) oriented transverse to said side surface of said first mounting arm at which said bail arm support is supported and (iii) disposed near a rotation axis of said bail arm support on said first shaft, said transmission mechanism further comprising an urging surface disposed at said superposed portion of said turnover lever, said urging surface making contact with said engaging projection when said turnover lever is operated to thereby apply a torque to said bail arm support to turn over said bail arm to said line releasing position; and said first mounting arm including a bias means which, when said bail arm support is changed over to one of said fishing line winding position and said fishing line releasing position, is turned over in a biasing direction, thereby biasing said bail arm support to one of said fishing line winding position and said fishing line releasing position of said bail arm, said bias means comprising (i) a coil spring, (ii) cylinder having a closed bottom, said spring being at least partially disposed within said cylinder, said cylinder including a pivot means rotatably fitted into a hole in said first mounting arm, and (iii) a rod attached to a pin at one end, said pin being rotatably fitted within a recess in said bail arm support, said rod having a free end disposed within said cylinder and within an inner space of said coil spring, said spring being interposed between said closed bottom of said cylinder and an outer surface of said pin.

2. A bail arm turning-over device according to claim 1, wherein said bail arm includes a roller for guiding a fishing line, the operating portion at said turnover lever extending outwardly from said roller.

3. A bail arm turning-over device according to claim 1, wherein the urging surface at said turnover lever is formed in a circular arc.

* * * * *